United States Patent
Cho et al.

(10) Patent No.: US 6,881,233 B2
(45) Date of Patent: Apr. 19, 2005

(54) POCKETED ELECTRODE PLATE FOR USE IN LITHIUM ION SECONDARY BATTERY, ITS MANUFACTURING METHOD AND LITHIUM ION SECONDARY BATTERY USING THE SAME

(75) Inventors: Su Jung Cho, Taejon (KR); Geun Chang Chung, Taejon (KR); Sun Yoo Hwang, Taejon (KR)

(73) Assignee: Korea Power Cell, Inc., Taejon (KR)

( * ) Notice: Subject to any disclaimer, the term of this patent is extended or adjusted under 35 U.S.C. 154(b) by 16 days.

(21) Appl. No.: 10/130,931

(22) PCT Filed: Sep. 14, 2001

(86) PCT No.: PCT/KR01/01545
§ 371 (c)(1),
(2), (4) Date: May 22, 2002

(87) PCT Pub. No.: WO02/25758
PCT Pub. Date: Mar. 28, 2002

(65) Prior Publication Data
US 2002/0182490 A1 Dec. 5, 2002

(51) Int. Cl.[7] .......................... H01M 2/18; H01M 10/04
(52) U.S. Cl. ................. 29/623.4; 29/623.5; 429/136; 429/137; 429/138
(58) Field of Search ................. 429/127, 144, 429/136–139, 162, 246, 247; 29/623.4, 623.5

(56) References Cited

U.S. PATENT DOCUMENTS

| 4,389,470 A | 6/1983 | Plasse ........................ 429/152 |
| 4,756,717 A | 7/1988 | Sturgis et al. ............. 29/623.3 |
| 5,296,318 A | 3/1994 | Gozdz ........................ 429/192 |
| 5,437,692 A | 8/1995 | Dasgupta et al. ........... 29/623.1 |
| 5,478,668 A | 12/1995 | Gozdz ........................ 429/127 |
| 5,512,389 A | 4/1996 | Dasgupta et al. ........... 429/192 |
| 5,741,608 A * | 4/1998 | Kojima et al. ................ 429/94 |
| 5,741,609 A | 4/1998 | Chen et al. .................. 429/192 |
| 5,981,107 A | 11/1999 | Hamano et al. ....... 429/231.95 |
| 6,225,010 B1 * | 5/2001 | Hamano et al. ............ 429/306 |

FOREIGN PATENT DOCUMENTS

| DE | 19924137 C2 * | 6/2003 | ............ H01M/2/14 |
| JP | 09-259866 | 10/1997 | |
| WO | WO99/48162 | 9/1999 | |
| WO | WO00/04601 | 1/2000 | |

* cited by examiner

*Primary Examiner*—Gregg Cantelmo
(74) *Attorney, Agent, or Firm*—Marger Johnson & McCollom, P.C.

(57) ABSTRACT

A pocketed electrode plate for use in a ultra-slim lithium ion secondary battery, its manufacturing method and a lithium ion secondary battery using the same. The pocketed electrode plate comprises an electrode plate which has a coating layer of an electrode active material and a non-coated projection portion. The electrode active material can reversibly insert and extract lithium ions. The electrode plates further includes separating membranes which cover both sides of the electrode plate while exposing only the non-coated projection portion, and an insulating polymer having an adhesive component on both surfaces thereof. The insulating polymer film is placed adjacent to edges of the electrode plate but does not cover any portion of the electrode surface. The insulating polymer film is thermally bonded onto two separating membranes. A plurality of pocketed electrode plates may be produced by using a pressing roll.

12 Claims, 5 Drawing Sheets

POCKETED ELECTRODE PLATE FOR USE IN LITHIUM ION SECONDARY BATTERY, ITS MANUFACTURING METHOD AND LITHIUM ION SECONDARY BATTERY USING THE SAME

TECHNICAL FIELD

The present invention relates to a lithium ion secondary battery, and especially to a pocketed electrode plate for use in a lithium ion secondary battery, its manufacturing method and the lithium ion secondary battery using the same.

The present invention is to revolutionarily improve the productivity and energy density of a slim lithium ion secondary battery with a thickness of 5 mm or less.

BACKGROUND ART

To meet the growing and diversifying needs of markets for portable electronic products such as mobile phones, camcorders and notebook computers, the demand for a rechargeable battery as a portable power supply is also increasing. As these portable electronic products become smaller and lighter, while providing better performance and multi-functional features, the requirement on the energy storage density of a secondary battery is increasing very rapidly. Years of research have yielded the current lithium ion secondary battery that adopts a pair of electrochemically active materials, typically lithium transition metal oxide for the cathode and carboneous material for the anode, which allows lithium ion to be inserted into and extracted from the host structure of the material reversibly. The lithium ion secondary battery has higher energy density per unit volume as well as per unit weight and increased charge and discharge lifetime compared to the existing aqueous solution type secondary batteries such as Ni—Cd and Ni—MH batteries, and is rapidly replacing existing batteries for portable electronic products. However, the rapid development and diversification of portable electronic products require batteries with higher energy density and more flexible form factors, thus pushing the limit of the current lithium ion secondary battery technology. In particular, the trend to manufacture slim and small electronic products increases demands for ultra-slim prismatic lithium ion secondary batteries however the adoption of current manufacturing methods for cylindrical or prismatic lithium ion batteries causes drastic lowering of energy density per volume in manufacturing slim prismatic batteries. Therefore, when a slim prismatic battery with a thickness less than 5 mm is used for high performance portable electronic products such as mobile phones, camcorders and notebook computers, it is difficult to maintain sufficient run time. Therefore, it is considered that the development of a slim prismatic lithium ion secondary battery with higher energy density per unit volume is essential in developing small, light and slim portable electronic products.

Figure 1:
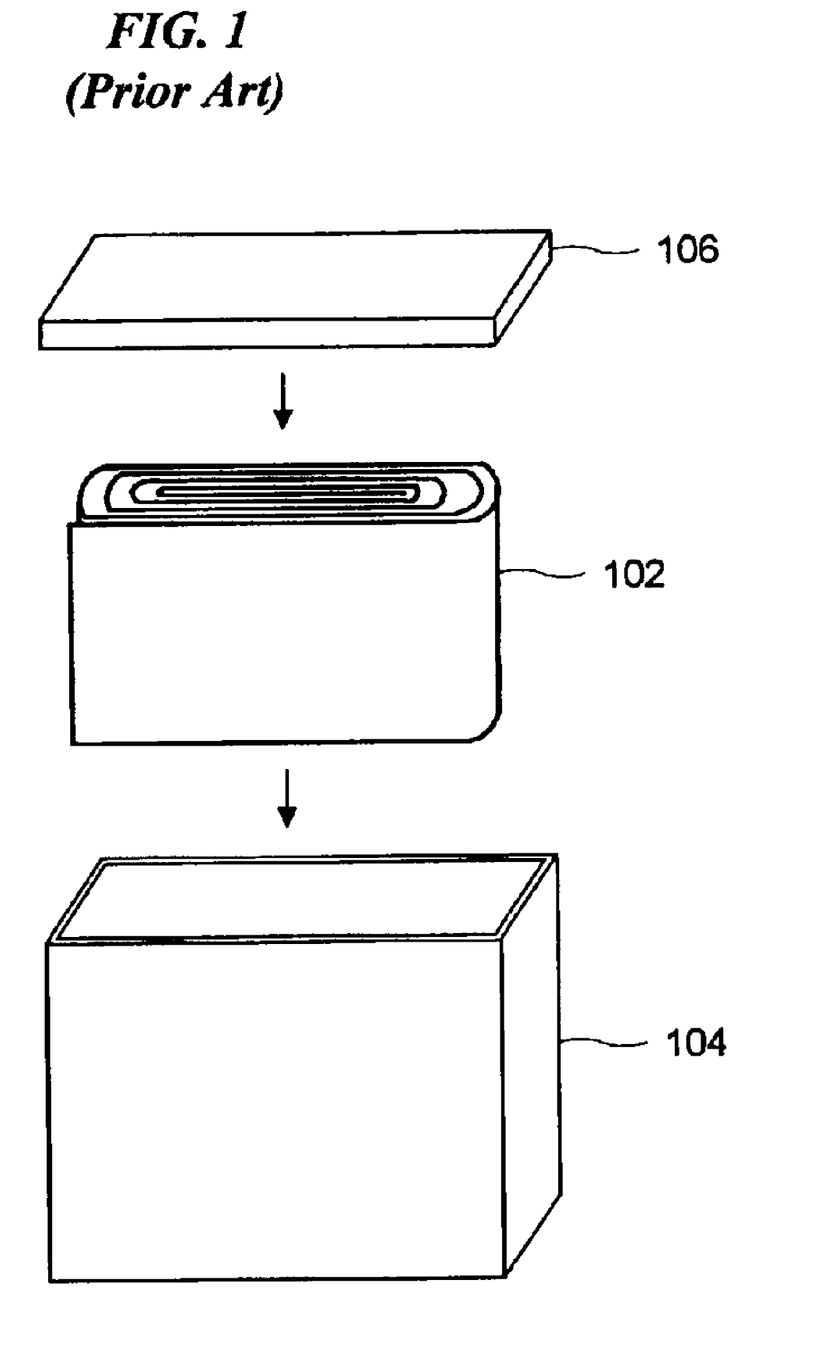
FIG. 1 is a schematic diagram of a manufacturing process of a prismatic lithium ion secondary battery described in a prior art.

FIG. 1 is a schematic diagram of a manufacturing process of a prismatic lithium ion secondary battery described in a prior art. The anode and cathode of a prismatic lithium ion secondary battery is integrated into one by the so-called winding method in which an anode and a cathode are rolled with a separator in-between them, and the integrated electrode is called a jelly roll. FIG. 1 shows that a lithium ion secondary battery is manufactured by inserting the jelly roll 102 into a prismatic can 104 followed by sealing the top with a cap 106 by laser welding. The anode and the cathode are manufactured by covering a mixture of a polymer binder, conductive powder and active material for each electrode onto copper and aluminum thin plates, respectively. Usually, a non-covered portion remains for the attachment of an electrode tab. An electrode tab made of nickel and aluminum is attached to each non-covered portion of an anode and a cathode respectively, and the two electrodes are connected to external terminals through the tabs. One of the electrode tabs attached to the non-covered portion is bound to either a bottom or a side of a can 104 when the jelly roll 102 is inserted into a can 104, and the other tab is bound to a cap 106. The benefit of the manufacturing method and the structure is that the whole electrode surface can be homogeneously utilized when a battery is charged or discharged because the cathode and the anode are physically and uniformly attached to each other by the tension applied to a separator in winding and they are also physically pressed to a wall of the can 104. Therefore, the battery thusly made has superior performance and maintains the high performance in the long term charging and discharging cycle. An additional benefit of a wall of a metallic can 104 with high mechanical strength is that it can contribute greatly to the increase in energy density per unit volume of a final battery because the jelly roll 102 can be filled strongly inside a can 104 by physical pressing and the change in thickness by swelling resulting from internal stress can be minimized. Furthermore, the complete fusion of the battery can 104 and the cap 106 separates the battery inside from the outside and the danger of a leak of battery internal material or infiltration of external impurities can be prevented.

However, the energy density of a slim prismatic lithium ion secondary battery with thickness below 5 mm manufactured using the same electrode under the aforementioned assembly method will be lowered more than a conventional cylindrical battery by around 30% as long as the constituent material is the same. The energy density will be decreased even further when the thickness is decreased. Furthermore, when the thickness is decreased most of the manufacturing processes such as jelly roll and electrolyte filling, insulation, separation of electrode terminal and fusion using laser will be more difficult and results in the lowering of yield and increase in manufacturing cost. The reasons for the decrease in energy density are summarized as below.

In first, the can for a prismatic battery in prior arts is usually manufactured by low temperature deep drawing, and the thickness of the can is about 0.4 mm when it is made of aluminum and is 0.3 mm when it is made of steel. The thickness of the packaging material of a cylindrical battery is about 0.2 mm which is half or two thirds of that of an aluminum or steel can. The volume or weight fraction of the thick packaging material becomes bigger as the battery gets thinner especially for a battery with thickness of 5 mm or less, and the use of a conventional can becomes a great limit in the manufacturing of a slim prismatic battery with high energy density.

In second, the shape of a jelly roll made by winding is not flat but is rather elliptical and can not be inserted inside a prismatic battery tightly, and results in a dead space. The loss of energy density of a battery is determined by the volume fraction of unused internal space to the whole internal space, and the loss of energy density for a slim prismatic battery with relatively small internal space will be severe. When the same electrodes are used, the energy density of a prismatic battery with thickness below 4 mm is usually 30% lower than that with thickness around 10 mm.

In third, in the winding process for a prismatic battery, an electrode has to be wound flatly unlike a cylindrical battery, which results in the folding of an electrode due to decreased radius of curvature at the ends of the jelly roll. In order to prevent damages on the electrode in this process, the thickness of an electrode has to be decreased or the amount of non-active binder to enhance flexibility and adhesion has to be increased. When several slim electrodes are wound more separating membranes and current collectors has to be incorporated into a battery, and the energy capacity of a battery decreases due to increased ratio of non-active material to active material. On the contrary, when the amount of non-active binder increases, the energy density of a battery decreases as the amount of the non-active binder increases compared to active electrode material.

The thinner the thickness of a prismatic battery is, the worse the problem gets, and it becomes very serious in a prismatic battery with thickness below 5 mm. So, a conventional assembly method of a prismatic battery can not satisfy the demand for ultra slim portable electronic products.

The decrease of energy density resulting from a jelly roll can be prevented by alternately stacking the existing slim separating membrane and electrodes. However, since the separating membrane is very flexible, alternate stacking of electrodes and separating membranes in a piece is very difficult even in a manual process, and its application is close to impossible considering productivity and yield. Furthermore, according to the method of prior arts the matching of the edge of a cathode to the edge of an anode is difficult and the prevention of short-circuiting of a cathode and an anode by a separating membrane is very difficult.

Therefore, in order to prevent the problem, a method of assembling a stacked body comprising a cathode, an anode and a separating membrane is proposed by providing adhesion between the electrodes and a separating membrane. The adhesion is achieved by pressing polymeric electrolyte (that performs a dual role as a separating membrane and ion conducting electrolyte) onto the surface of the electrode by heat and pressure or by covering the adhesive component at the contact surface between the electrode and the separating membrane.

In U.S. Pat. Nos. 5,296,318 and 5,478,668, a battery maintaining adhesion without external pressure is proposed by applying ion conductive gel polymer onto an anode, a cathode and a separating membrane followed by heat lamination. This type of a battery is called a lithium ion polymer battery or simply a polymer battery. This battery employs low ion conductive gel type polymer electrolyte as an ion conductor of an electrode and a separating membrane, so it shows insufficient charging discharging speed and a decreased performance at low temperature compared to the lithium ion battery. In addition, excess non-active polymer is used for the electrode of a lithium ion polymer battery even though there are variations in chemical composition, and the thickness of a separating membrane has to be increased due to low mechanical strength of an ion conductive separating membrane. Therefore, this type of a battery can not basically excel the prismatic lithium ion battery in energy density per unit volume.

On the other hand, in order to fully exercise benefits of the existing lithium ion battery, U.S. Pat. No. 5,437,692 U.S. Pat. No. 5,512,389 U.S. Pat. No. 5,741,609 and WO 9948162 disclose methods increasing adhesion between the two electrodes and a separating membrane by placing a thin adhesion layer between a separating membrane and an anode, and a separating membrane and a cathode without employing polymer gel electrolyte. In this structure, increased energy density can be obtained and a stable battery performance is expected because the decrease of ionic conductivity is lowered compared to the gel type polymer electrolyte and also the amounts of non-active polymer gel can be greatly decreased. However, in this technology discharging performance can be decreased compared to the existing lithium ion battery due to a covering of conductivity decreasing adhesive material on the whole active electrode surface.

Therefore, in order to solve the problem, U.S. Pat. No. 5,981,107 discloses a method of covering an adhesive component on the part of interface of an electrode and a separating membrane, and additional formation of a convex and concave surface to increase moist containing capacity of electrolyte. Furthermore, WO 0004601 discloses a method of sticking an electrode to a separating membrane by forming a hole at the part of an anode and a cathode followed by filling the hole with adhesive polymer. However, the process of forming an adhesive part is difficult in this method. Especially, the U.S. Pat. No. 5,981,107 has a problem of performance difference of a battery between the part covered with adhesive polymer and the non-covered part, and the method according to WO 0004601 has a difficulty of precise aligning of holes formed in an anode and a cathode.

Furthermore, in the aforementioned stacked body, there is an adhesion between an electrode and an electrolyte layer without pressure applied by a packaging material, and a method in which a slim prismatic lithium ion secondary battery is manufactured by sealing a battery with an aluminum laminate packaging material which is thinner and lighter than existing metal packaging material is proposed. The aluminum laminate packaging material comprises a polymer layer capable of heat lamination sealing, a layer of material which is rarely penetrable by external impurities, and an insulating cover. Such packaging material has an advantage that it is thinner and lighter than existing metal packaging material. Accordingly, if it is used as a substitute for the metal packaging material, the weight of a battery can be decreased and energy density per unit thickness can be increased because the metal packaging material contributes significantly to the thickness and weight of a slim battery.

In addition, since the packaging material is electrically insulating, it is easy to insert multi-layer electrode stack or jelly roll without the danger of short-circuiting. However, the mechanical strength of the packaging material is low in spite of the merits of thin and light characteristics, and there can be problems resulting from mechanical weakness of a stacked packaging material even though adhesion between an electrode and a separating membrane can be managed by any of the aforementioned method. Especially, the following three problems can be fatal in the manufacturing and the use of a battery.

In first, a battery is sealed by heat lamination of innermost polymer layer of aluminum laminated packaging material, and its sealing strength is lower than that of laser sealing applied to existing prismatic batteries. Especially, the sealing of a portion where an electrode tab is projected through packaging material is determined by the adhesion between a polymer layer and a metal layer, and there is always a gap at the edge of the metal tab. Accordingly, the portion is prone to failure due to leakage of electrolyte. Even in the middle of normal use, the sealing part comprising the metal tab and polymer cover can be easily cracked due to internal pressure increase resulting from expansion of an electrode and gas generation, and there is a danger of leakage of electrolyte or introduction of external impurities such as moisture. The problem gets worse when gas is continuously generated due to impurities emanated from the electrode and electrode active material and impurities introduced in each battery assembly step. So the introduction of impurities should be controlled strictly in each battery-manufacturing step but it will also increase process cost. The danger of a leak due to cracks in adhesion layer is severe when the possibility of gas generation due to side reactions in a battery increases and the adhesion at the adhesion layer gets loosened which is observed at high temperature. When there is a leak, it will be fatal to battery performance and it may contaminate and decrease the life span of the electronic circuit of an expensive electronic product in which the battery is placed.

In second, the existing prismatic battery employs a metallic can with enough mechanical strength and there is no severe increase in thickness due to internal pressure increase, but the aluminum laminate packaging material can not bear internal pressure and the thickness of a battery may increase. The increase of the thickness will change the appearance of a battery pack, make it impossible to be normally placed in a battery pack, and bring on discontent in appearance. This problem is worsened when the surface area of a battery is increased to enhance battery capacity, which makes it difficult to manufacture a high capacity battery with thickness below 5 mm.

In third, the weak mechanical strength of an aluminum laminate packaging material lowers reliability and stability of a battery. A battery is used from at least 6 months to several years and requires superior durability in a wide temperature range as well as under diverse mechanical shocks. The existing prismatic battery adopts a metal can for a packaging material and the danger of damages due to external pressure, or local changes due to sharp ends such as a nail is not great but the aluminum packaging material has significantly decreased thickness and strength compared to the existing metal packaging material and is susceptible to damages by external shock or fire. The stability issue is critical to a high capacity battery used for a portable computer or to a battery used without an external plastic housing to make a slim battery pack.

The above review shows many limitations in manufacturing a durable, stable and slim battery with high energy density and easy manufacturing steps. In summary, the existing prismatic lithium ion battery has problems resulting from a large portion of internal space that is not used due to a jelly roll type electrode structure, and energy density is decreased greatly according to the decrease of total battery thickness due to a technical limit in decreasing thickness of a metal packaging material manufactured by low temperature deep drawing. On the other hand, a lithium ion polymer battery assembled by sealing a stacked electrode body with an aluminum laminate packaging material has decreased dead space resulting from a jelly roll, but the energy density is decreased and the battery performance is lowered because an excess polymer binder is used for a sealing between electrodes or an adhesive layer is coated on the interfacial surface of the electrode and the electrolyte. Furthermore, the aluminum laminate packaging material has problems in durability and safety due to mechanical weakness and insufficient adhesion at adhesive surface comprising a polymer cover and a metal tab.

DISCLOSURE OF THE INVENTION

One object of the present invention is to provide a pocketed electrode plate which can prevent formation of wrinkles at separating membranes of a pocketed electrode plate.

Another object of the present invention is to provide a lithium ion secondary battery with high energy density using the pocketed electrode plate.

A further object of the present invention is to provide a manufacturing method of a pocketed electrode plate suitable for mass production of a lithium ion secondary battery.

In order to achieve the above objects, the present invention provides a pocketed electrode plate for use in a lithium ion secondary battery manufactured by an electrode-stacking manner, the pocketed electrode plate comprising:

an electrode plate which has a coating layer of an electrode active material and a non-coated projection portion, the electrode active material being capable of reversibly inserting and extracting lithium ions;

separating membranes which cover both sides of the electrode plate while exposing only the non-coated projection portion; and an insulating polymer film which contains an adhesive component and is placed between the separating membranes at least on the portion of the external edge of the electrode plate in order to bond and fix the separating membranes.

In order to achieve the above objects, the present invention provides a lithium ion secondary battery having stacked electrodes, the battery comprising:

(a) a plurality of pocketed cathode plates, each cathode electrode plate comprising, (a-1) an electrode plate which has a coating layer of an electrode active material and a non-coated projection portion, the electrode active material being capable of reversibly inserting and extracting lithium ions;

(a-2) separating membranes which cover both sides of the electrode plate while exposing only the non-coated projection portion; and (a-3) an insulating polymer film which contains an adhesive component and is placed between the separating membranes at least on the portion of the external edge of the electrode plate in order to attach and fix the separating membranes; and (b) a plurality of anode plates, each anode plate containing a material capable of reversibly inserting and extracting lithium ions; wherein the cathode and anode plates are alternately stacked.

Preferably, the size of the pocketed cathode plate is no smaller than that of the anode plate, and the area of the anode plate is larger than that of the coating layer of the cathode plate.

In order to achieve the above objects, the present invention provides a method of manufacturing pocketed electrode plates for use in a lithium ion secondary battery manufactured by an electrode-stacking manner, the method comprising the steps of:

(a) providing a plurality of electrode plates having the same shape, each of which has a coating layer of an electrode active material and a non-coated projection portion, the electrode active material being capable of reversibly inserting and extracting lithium ions;

(b) providing a tape-shaped insulating polymer film with both sides covered with an adhesive component;

(c) blanking parts of the polymer film so that the polymer film may have empty regions where the electrode plates are aligned and contained to a specified spacing;

(d) aligning the electrode plates within the empty regions to a specified spacing;

(f) locating tape-shaped separating membranes on both sides of the polymer film with electrode plates contained therein in order to cover the electrode plates while exposing only the non-coated projection portions of the electrode plates;

(g) passing the polymer film covered with the separating membranes through a pressing roll in a heated state; and (h) stamping out the pressed polymer film to form a plurality of pocketed electrode plates;

wherein each pocketed electrode plate is stacked in the order of a separating membrane/an electrode plate/a separating membrane, and wherein the separating membranes are bonded by the insulating polymer film at least on the portion of the external edge of the electrode plate.

BEST MODE FOR CARRYING OUT THE INVENTION

Hereinafter, preferred embodiments of the present invention will be explained with reference to the attached drawings and the pocketed electrode plate and its manufacturing method are explained together but the pocketed electrode plate is limited to the cathode plate in the example.

FIGS. 2A to 2G are diagrams of a manufacturing process of a pocketed electrode plate according to one example of the present invention.

Figure 2A:
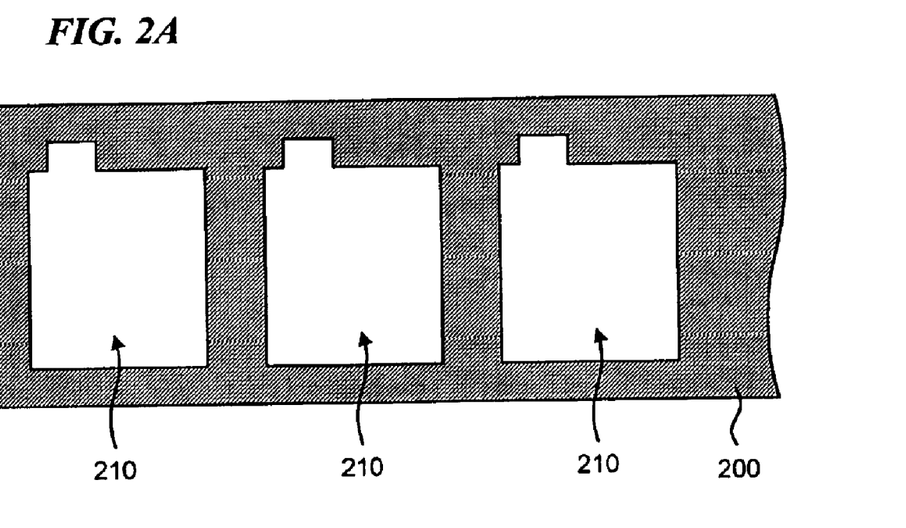
FIGS. 2A to 2G are diagrams of a manufacturing process of a pocketed electrode plate according to one example of the present invention.

FIG. 2A is a diagram illustrating one example of insulating polymer film to manufacture a pocketed electrode plate according to the present invention. In FIG. 2A, there are multiple longitudinal perforated spaces 210 on a continuous roll of polymer film covered with an adhesive component on both sides. The perforated space 210 are separated at an equal distance with the same shape, and each perforated space 210 are formed bigger than the cathode plate to position the cathode plates at a distance as described below. In manufacturing a pocketed electrode plate of the present invention, the diverse shape of perforated space of an insulating polymer film can be selected only if the cathode plates are contained within the empty regions of the insulating polymer film to a specified spacing and the polymer film surrounds at least edge portion of each cathode plate. Therefore, if the cathode plate is rectangular in shape with a non-coated projection portion, then the desirable shape of a perforated space of polymer film is such that it surrounds at least two sides of the cathode plate.

Figure 2B:
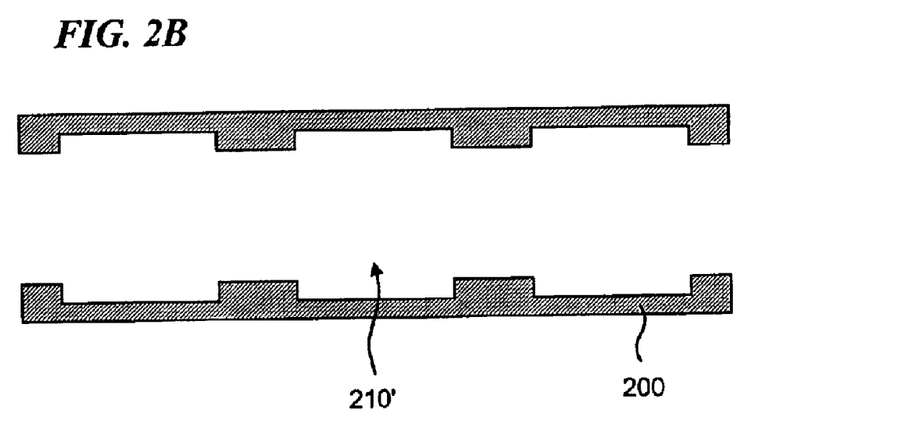

FIG. 2B is another example of an insulating polymer film to manufacture a pocketed electrode plate according to the present invention. FIG. 2B shows that there is a perforated space 210' with its shape changing periodically on the continuous roll of polymer film 200 with an adhesive component on both sides.

Preferably, the insulating polymer film is selected from a group consisting of polyolefin film, polyester film, polystyrene film, polyimide film, polyamide film, fluorocarbon resin film, ABS film, polyacrylic film, acetal film, and polycarbonate film.

Furthermore, the adhesive component covered on both sides of the insulating polymer film is preferably selected from a high temperature fused adhesive group consisting of ethylene vinyl acetate, ethylene ethyl acetate, ethylene acrylic acid type compound, ionomer type compound, polyethylene, polyvinylacetate, and polyvinylbutyral.

Figure 2C:
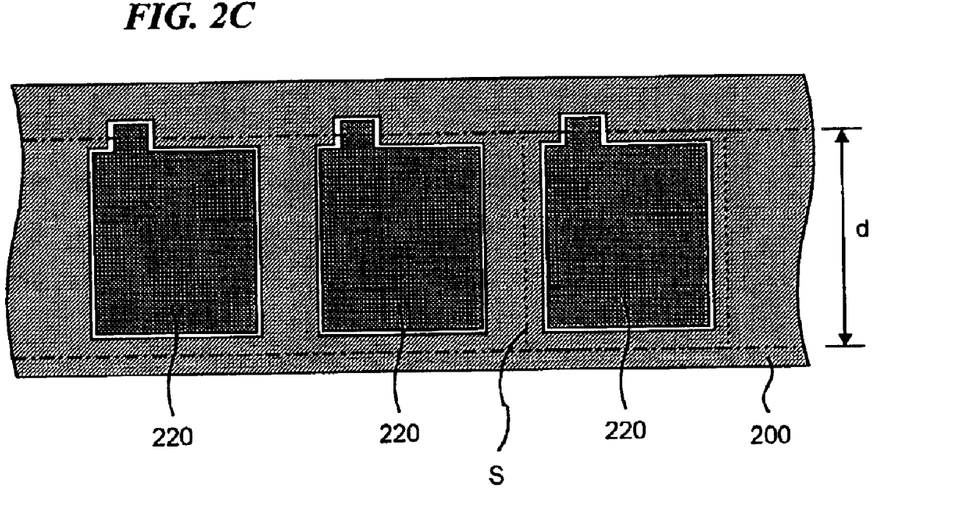

FIG. 2C is a diagram showing the step of locating a cathode plate and a separating membrane inside a perforated space of insulating polymer film 200 of FIG. 2A. FIG. 2C shows that the cathode plate comprising a coating layer of lithium transition metal oxide, the cathode active material, and a non-coated projection portion are located with a specified spacing in each perforated space. The size of a cathode plate or a perforated space is controlled to keep the spacing around the projection portion of the cathode plate bigger than the spacing in other portions. Thereafter, separating membranes (not drawn) with width of d is placed on both sides of polymer film 200 which is located with the cathode plate 220, but only the non-coated projection portion on the cathode plates 220 are exposed while other portion of the cathode plates are covered. In FIG. 2C, the space occupied by separating membranes is spacing in-between one-dot chain line. In FIG. 2C, the space inside a dotted line S is a cutting line to obtain each pocketed electrode plate after pressurizing and adhering processes described below. According to the procedure described above, a roll of resulting material laminated in the order of lower separating membrane/insulating polymer film covered with adhesive component and cathode plate located at the perforated space of the polymer film/upper separating membrane can be obtained.

Figure 2D:
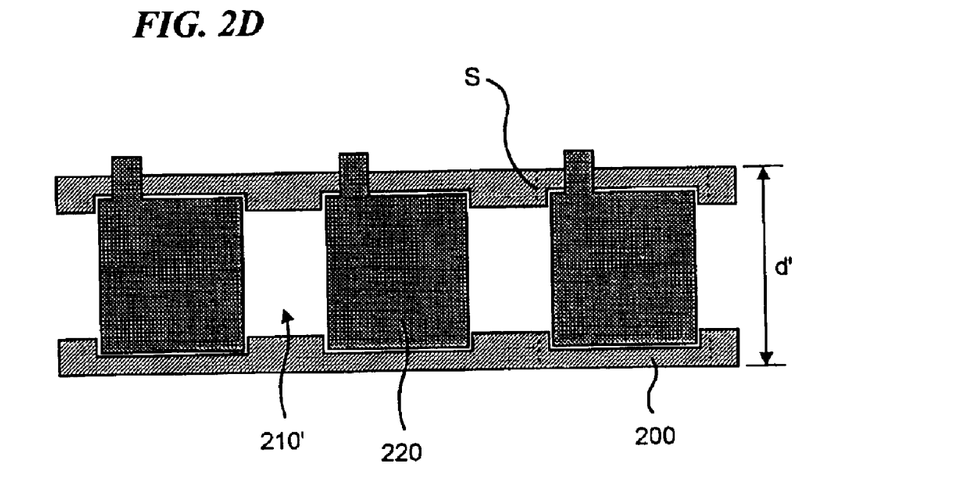

FIG. 2D is a diagram showing the step of locating a cathode plate and a separating membrane inside a perforated space of the insulating polymer film 200 of FIG. 2B. FIG. 2D shows that separating membranes (not drawn) with width of d' is located on both sides of the polymer film 200 which is located with the cathode plate 200. The size of the cathode plates 220 or that of perforated space is determined so that the non-coated projection portion of the cathode plate is projected outside the polymer film 200. In FIG. 2D, the separating membrane has the same width with the polymer film and is placed along the polymer film. In FIG. 2C, the space inside a dotted line S is also a cutting line to obtain each pocketed electrode plate after pressurizing and adhering processes described below.

Figure 2E:
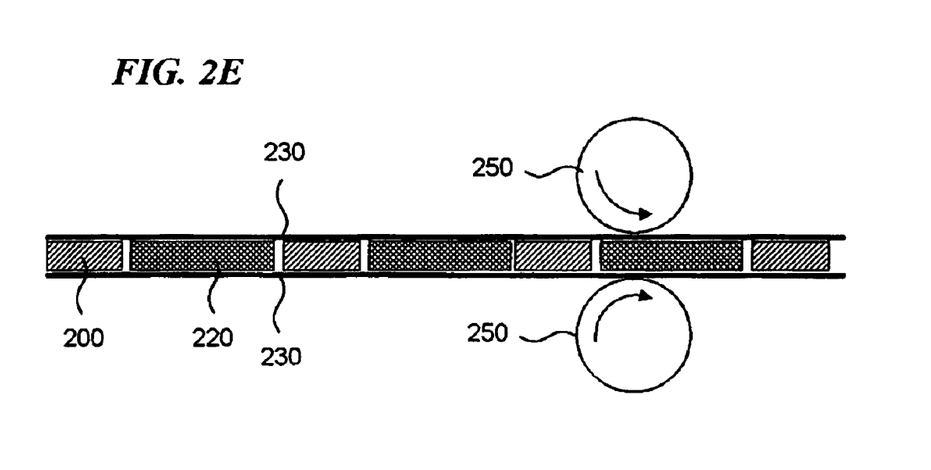

FIG. 2E is a diagram showing a pressurizing process of a resulting material of FIG. 2C. In FIG. 2E, the resulting material comprising an insulating polymer film 200 covered with separating membrane 230/adhesive component and cathode plate 220/separating membrane 230 located at the perforated space is heated and fused in the shape of a continuous scroll by a pressure roll 250. In FIG. 2E, the resulting material of FIG. 2C is represented by a longitudinal cross section. By the pressurized fusing a strong adhesion is achieved wherever the insulating polymer film is but there is no adhesion or deformation where the cathode plate 220 is.

Desirable separating membrane used by the above example is a porous polymer film made of a polyolefin material with a porous ratio of 25–60% and a width of 10–30 micron. Furthermore, the desirable heated fusing temperature for polyethylene is below 120° C. and that of polypropylene is below 150° C.

Figure 2F:
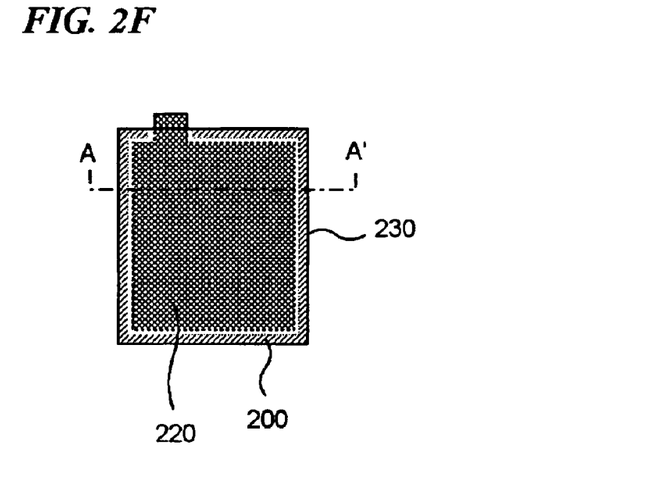

FIG. 2F is a diagram showing a pocketed electrode plate manufactured by perforating the pressurized resulting material according to the explanation of FIG. 2E along the dotted line of FIG. 2C. In FIG. 2F, the adhesive portion of the cathode plate 220 and the insulating polymer film 200 is drawn perspectively to clarify the drawing. In FIG. 2F, the adhesive portion surrounds all the external edge of the cathode plate 220, and only the non-coated projection portion of the cathode plate 220 is exposed without being covered by the separating membrane 230.

If a pocketed electrode plate is manufactured using the resulting material drawn in FIG. 2D, the adhesive portion will surround only the upper and lower external edges of the cathode plate.

If a pocketed electrode plate is manufactured by the method described above, a mass production of a pocketed electrode plate is possible.

Figure 2G:
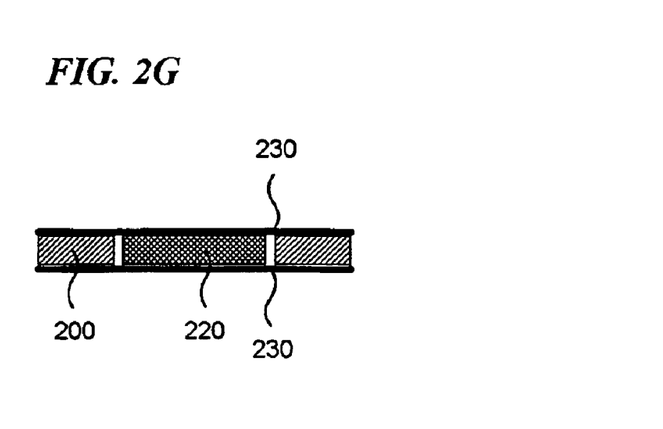

FIG. 2G is a cross-sectional view along the A–A' line of FIG. 2F. As shown in FIG. 2G, the difference between the thickness of a stacked portion of separating membrane 230/cathode plate 220/separating membrane 230 and that of separating membrane 230/insulating polymer film 200 covered with an adhesive component/separating membrane 230 is smaller than those in prior arts, and the generation of wrinkles in the separating membrane of the pocketed electrode plate manufactured according to the present invention is decreased.

FIG. 2C is a diagram comparing the size of the pocketed electrode plate and the anode.

Figure 3:
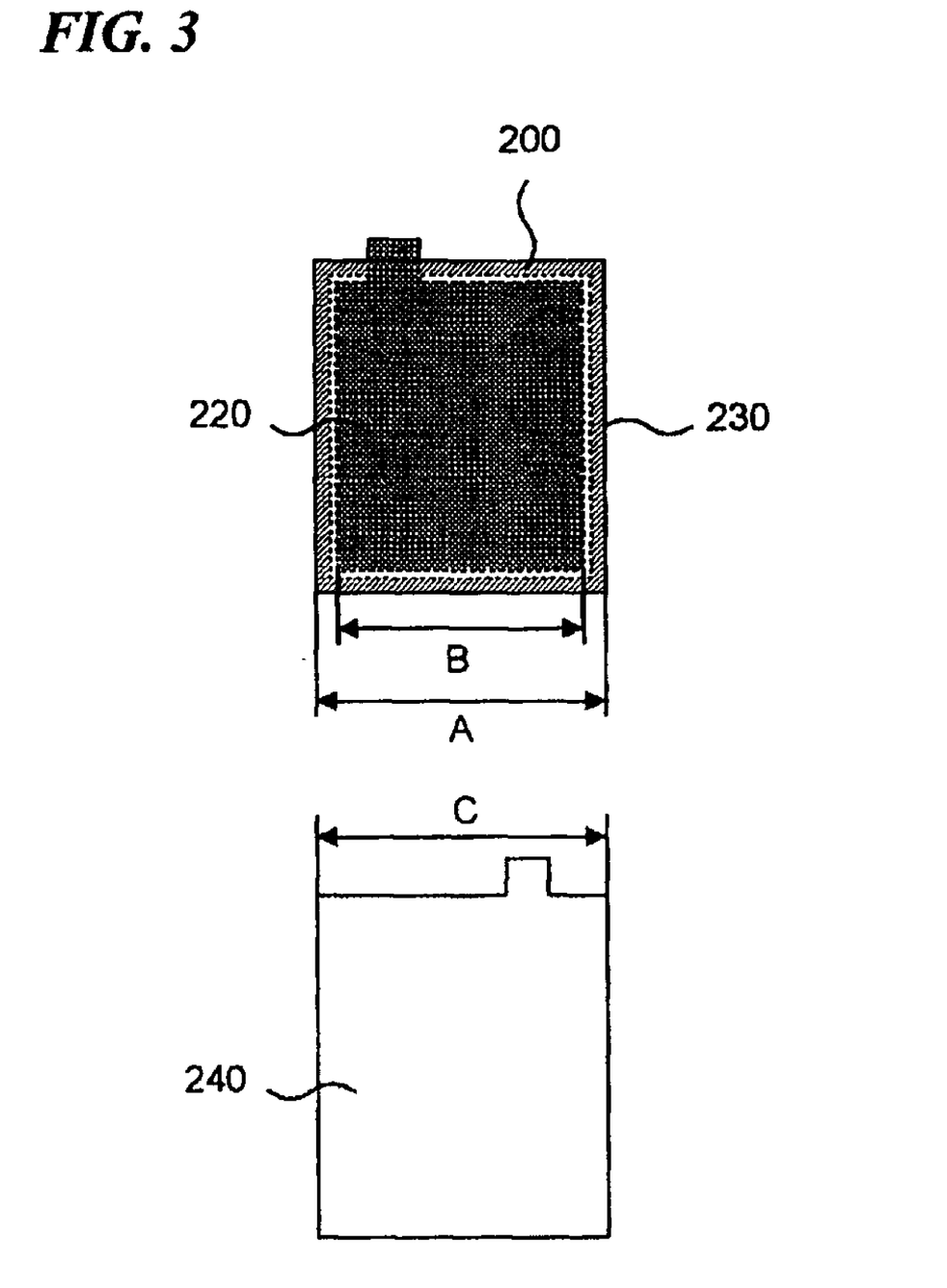
FIG. 3 is a diagram comparing the size of a pocketed electrode plate and an anode plate used in one example of the present invention.

When a lithium ion secondary battery is manufactured by an electrode plate stacking method, it is desirable to keep the size of the perforated pocketed electrode plate equal to or bigger than that of the anode plate and the size of the anode plate bigger than that of the cathode active material covered area of the cathode plate in order to prevent edge mismatch of active plate of an anode and a cathode and to maintain a smooth stacking alignment. Therefore, as shown in FIG. 3, if both the cathode plate and the anode plate are rectangular with a non-coated projection portion, it is desirable to follow the equation 1 among the width of the cathode plate B, the width of a separating membrane for pocketing and the width of an anode plate C.

$$A \geq C \geq B + A - B/2 \quad \text{[Equation 1]}$$

More desirably, if the pocketed electrode plate except for each projection portion and the edge anode are made to coincide, the condition that all plates facing the cathode should be covered with an anode is automatically satisfied.

After aligning and stacking the pocketed electrode plates and the anode plates, the non-coated projection portions of the anode plates are fused to one another and the non-coated projection portions of the cathode plates are fused to one another. Then, each of them is connected to an anode tab and a cathode tab, respectively. By sealing it inside a metal packaging material, a lithium ion secondary battery is manufactured.

The performances of the lithium ion secondary battery manufactured according to the present invention are summarized as below.

[Prismatic Battery with Thickness of 2.4 mm]

For a prismatic battery having curved corners manufactured with thickness of 2.4 mm, short diameter of 35 mm and long diameter of 62 mm, the reversible capacity is 620 mAh which is 440 Wh/liter when converted to energy density per volume.

[Prismatic Battery with Thickness of 4.0 mm]

For a prismatic battery having curved corners manufactured with thickness of 4.0 mm, short diameter of 35 mm and long diameter of 62 mm, the reversible capacity is 1100 mAh which is 470 Wh/liter when converted to energy density per volume.

The pocketed electrode plate manufactured according to the present invention has higher adhesive strength with decreased adhesion area and, therefore, the energy density of a finished lithium ion secondary battery can be increased. Furthermore, the pocketed electrode plate can be manufactured in a continuous roll process, and a mass production of a lithium ion secondary battery is made easy. Herein above the invention has been described in reference to the preferred embodiments, but various other modifications and variations will be apparent to those skilled in the art without departing from the scope and spirit of the present invention. The pocketed electrode plate is limited to a cathode plate in the example of the present invention, but it is understood that an anode electrode plate can be used as a pocketed electrode plate as far as the limitation condition on the active material covering area is satisfied.

What is claimed is:

1. A pocketed electrode plate for use in a lithium ion secondary battery manufactured by an electrode-stacking manner, the pocketed electrode plate comprising:
    an electrode plate which has a coating layer of an electrode active material and a non-coated projection portion, the electrode active material being capable of reversibly inserting and extracting lithium ions;
    separating membranes which cover both sides of the electrode plate while exposing only the non-coated projection portion; and
    an insulating polymer film having an adhesive component on both surfaces thereof, the insulating polymer film being placed adjacent to edges of the electrode plate but not covering any portion of the coating layer of the electrode plate,
    wherein the insulating polymer film is sandwiched between the two separating membranes, and wherein the interface between the insulating polymer film and separating membrane is bonded by a thermal fusion of the adhesive component on the both surfaces of the insulating polymer film, and wherein the separating membranes are in direct contact with the both sides of the electrode plate.

2. The pocketed electrode plate of claim 1, wherein the insulating polymer film is selected from the group consisting of polyolefin film, polyester film, polystyrene film, polyimide film, polyamide film, fluorocarbon resin film, ABS film, polyacrylic film, acetal film, and polycarbonate film.

3. The pocketed electrode plate of claim 2, wherein the adhesive component on the insulating polymer film is comprised of a compound selected from the high temperature melt fused adhesive group consisting of ethylene vinyl acetate, ethylene ethyl acetate, ethylene acrylic acid, polyethylene, poly-vinyl-acetate, and poly-vinyl-butyral.

4. The pocketed electrode plate of claim 1, wherein the electrode plate pocketed by the separating membranes is a cathode plate.

5. The pocketed electrode plate of claim 1, wherein the separating membranes comprise a porous polymer film.

6. The pocketed electrode plate of claim 5, wherein the porous polymer film is made of a polyolefin material with a porous ratio of 25–60% and a width of 10–30 microns.

7. A lithium ion secondary battery having stacked electrodes, the battery comprising:
    (a) a plurality of pocketed cathode plates, each cathode electrode comprising,
        (a-1) an electrode plate which has a coating layer of an electrode active material and a non-coated projection portion, the electrode active material being capable of reversibly inserting and extracting lithium ions;
        (a-2) separating membranes which cover both sides of the electrode plate while exposing only the non-coated projection portion; and (a-3) an insulating polymer film having an adhesive component on both surfaces thereof, the insulating polymer film being placed adjacent to edges of the electrode plate but not covering any portion of the coating layer of the electrode plate, wherein the insulating polymer film is sandwiched between the two separating membranes, and wherein the interface between the insulating polymer film and separating membrane is bonded by a thermal fusion of the adhesive component on the both surfaces of the insulating polymer film; and (b) a plurality of anode plates, each anode plate containing a material capable of reversibly inserting and extracting lithium ions;

wherein the separating membranes are in direct contact with the both sides of the electrode plate.

8. The lithium ion secondary battery of claim 7, wherein the size of the pocketed cathode plate is no smaller than that of the anode plate, and wherein the area of the anode play is larger than that of the coating layer of the cathode plate.

9. A method of manufacturing pocketed electrode plates for use in a lithium ion secondary battery manufactured by an electrode-stacking manner, the method comprising:

(a) providing a plurality of electrode plates having the same shape, each of which has a coating layer of an electrode active material and a non-coated projection portion, the electrode active material being capable of reversibly inserting and extracting lithium ions;

(b) providing a tape-shaped insulating polymer film with both sides covered with an adhesive component;

(c) blanking parts of the polymer film so that the polymer film may have empty regions where the electrode plates are aligned and contained to a specified spacing;

(d) aligning the electrode plates within the empty regions to a specified spacing;

(f) locating tape-shaped separating membranes on both sides of the polymer film with electrode plates contained therein in order to cover the electrode plates while exposing only the non-coated projection portions of the electrode plates;

(g) passing the polymer film covered with the separating membranes through a pressing roll in a heated state; and (h) stamping out the pressed polymer film to form a plurality of pocketed electrode plates;

wherein each pocketed electrode plate is stacked in the order of a separating membrane/ an electrode plate/ a separating membrane, and wherein the separating membranes are bonded by the insulating polymer film at least on the portion of external edges of the electrode plate.

10. The method of claim 9, wherein the electrode plate pocketed with the separating membranes is a cathode plate and the size of the stamped-out cathode plate is no smaller than that of an anode plate, and wherein the area of the anode plate is larger than that of the coating layer of the cathode plate.

11. The method of claim 9, wherein the insulating polymer film is selected from the group consisting of polyolefin film, polyester film, polystyrene film, polyimide film, polyamide film, fluorocarbon resin film, ABS film, polyacrylic film, acetal film, and polycarbonate film.

12. The method of claim 11, wherein the adhesive component is selected from the high temperature fused adhesive group consisting of ethylene vinyl acetate, ethylene ethyl acetate, ethylene acrylic acid, polyethylene, polyvinylacetate, and polyvinylbutyral.

* * * * *

UNITED STATES PATENT AND TRADEMARK OFFICE
CERTIFICATE OF CORRECTION

PATENT NO. : 6,881,233 B2
APPLICATION NO. : 10/130931
DATED : April 19, 2005
INVENTOR(S) : Cho et al.

It is certified that error appears in the above-identified patent and that said Letters Patent is hereby corrected as shown below:

On the Title page, please insert --item (30) Foreign Application Priority Data
Sept. 25, 2000 [KR] 2000.56104--

Column 11, line 19, please replace "anode play" with --anode plate--

Signed and Sealed this

Nineteenth Day of December, 2006

JON W. DUDAS
*Director of the United States Patent and Trademark Office*